US006751719B1

(12) United States Patent
Peloquin et al.

(10) Patent No.: US 6,751,719 B1
(45) Date of Patent: Jun. 15, 2004

(54) METHOD AND AN APPARATUS TO DYNAMICALLY ORDER FEATURES AND TO RESOLVE CONFLICTS IN A MULTIPLE-LAYER LOGICAL VOLUME MANAGEMENT ENVIRONMENT

(75) Inventors: Mark A. Peloquin, Austin, TX (US); Benedict Michael Rafanello, Round Rock, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 09/697,449

(22) Filed: Oct. 26, 2000

(51) Int. Cl.[7] .............................................. G06F 12/06
(52) U.S. Cl. ....................... 711/210; 711/112; 707/514; 707/100
(58) Field of Search ........................ 711/111, 112, 173, 711/209, 207, 170, 210; 707/200, 205, 10, 100, 514, 520

(56) References Cited

U.S. PATENT DOCUMENTS

| | | | |
|---|---|---|---|
| 5,129,088 A | | 7/1992 | Auslander et al. .............. 711/1 |
| 5,131,087 A | | 7/1992 | Warr .......................... 711/113 |
| 5,325,505 A | | 6/1994 | Hoffecker et al. ........... 707/101 |
| 5,815,705 A | | 9/1998 | Slivka et al. ................... 713/2 |
| 5,842,214 A | * | 11/1998 | Whitney et al. ............... 707/10 |
| 5,862,331 A | * | 1/1999 | Herriot ........................ 709/219 |
| 5,903,913 A | * | 5/1999 | Ofer et al. ................... 711/112 |
| 5,946,685 A | * | 8/1999 | Cramer et al. ................ 707/10 |
| 6,003,045 A | | 12/1999 | Freitas et al. ................ 707/205 |
| 6,061,743 A | * | 5/2000 | Thatcher et al. ............. 707/100 |
| 6,216,202 B1 | * | 4/2001 | D'Errico ..................... 711/112 |
| 6,256,031 B1 | * | 7/2001 | Meijer et al. ................ 707/203 |
| 6,381,627 B1 | * | 4/2002 | Kwan et al. ................... 707/10 |
| 6,393,540 B1 | * | 5/2002 | Blumenau et al. ........... 711/165 |
| 6,401,183 B1 | * | 6/2002 | Rafizadeh ................... 711/173 |
| 6,449,652 B1 | * | 9/2002 | Blumenau et al. ........... 711/164 |
| 6,453,383 B1 | * | 9/2002 | Stoddard et al. ............. 711/112 |
| 6,457,139 B1 | * | 9/2002 | D'Errico et al. ................ 714/5 |
| 6,496,839 B2 | * | 12/2002 | Cabrera et al. .............. 707/203 |
| 6,516,325 B1 | * | 2/2003 | Blanchard et al. ........ 707/104.1 |
| 6,636,871 B1 | * | 10/2003 | Rafanello et al. ............ 711/111 |
| 6,647,393 B1 | * | 11/2003 | Dietterich et al. ........... 707/102 |
| 6,654,881 B2 | * | 11/2003 | Cabrera et al. .............. 713/100 |
| 6,671,688 B1 | * | 12/2003 | Nikols et al. ................... 707/10 |

FOREIGN PATENT DOCUMENTS

| | | | |
|---|---|---|---|
| WO | WO 98/04981 | 2/1998 | ........... G06F/17/20 |

OTHER PUBLICATIONS

Ogata et al., *A Real–Time Volume Rendering Architecture using an Adaptive Resampling Scheme for Parallel and Perspective Projections*, IEEE Symposium on Volume Visualization (Cat. N. 989EX300), pp. 31–38, 164, Published in New York, NY, USA, 1998, 178 pp., Abstract.

IBM Technical Disclosure, *Shared Memory Cluster—A Scalable Multiprocessor Design*, vol. 37, No. 06A, Jun. 1994, pp. 503–507.

* cited by examiner

*Primary Examiner*—Pierre-Michel Bataille
(74) *Attorney, Agent, or Firm*—Duke W. Yee; David A. Mims, Jr.; Wayne P. Bailey

(57) ABSTRACT

A method and apparatus to dynamically order features and resolve conflicts in a logical volume management environment is provided. The method and apparatus classifies features of a logical volume into partition level, aggregate level and volume level classes. Based on these classes and the attributes associated with each feature, ordering of the features in a feature stack is performed and conflicts between features identified for conflict resolution. In addition, the apparatus and method provides a mechanism by which a default ordering of features selected by a user may be generated for a logical volume. The user may accept this default ordering or edit the ordering as long as the user does not generate any conflicts. Any conflicts generated will be reported to the user and the attempted ordering will not be allowed.

16 Claims, 3 Drawing Sheets

| ATTRIBUTE | DESCRIPTION |
|---|---|
| GlobalExclusive | A PLUG-IN WITH THIS ATTRIBUTE CAN NOT WORK WITH ANY OTHER PLUG-IN. IT MUST BE THE ONLY PLUG-IN IN USE ON THE VOLUME. |
| TopExclusive | A PLUG-IN WITH THIS ATTRIBUTE MUST BE THE TOPMOST PLUG-IN IN THE CLASS. |
| BottomExclusive | A PLUG-IN WITH THIS ATTRIBUTE MUST BE THE BOTTOMMOST PLUG-IN IN THE CLASS. |
| ClassExclusive | A PLUG-IN WITH THIS ATTRIBUTE WILL NOT WORK WITH ANY OTHER PLUG-IN IN THIS CLASS. |
| Weight_Factor | A VALUE BETWEEN 1 AND 100 WHERE A VALUE OF 1 INDICATES THAT THE PLUGIN WANTS TO BE AS CLOSE TO THE BOTTOM OF THE PLUG-INS IN THIS CLASS AS POSSIBLE AND A VALUE OF 100 MEANS THAT THIS PLUG-IN WANTS TO AS CLOSE TO THE TOP OF THE PLUG-INS IN THIS CLASS AS POSSIBLE. |
| Feature_Class | EITHER VOLUME CLASS, AGGREGATE CLASS, OR PARTITION CLASS. IDENTIFIES IN WHICH OF THE THREE LAYERS OF THE FEATURE STACK THIS FEATURE MUST APPEAR. |

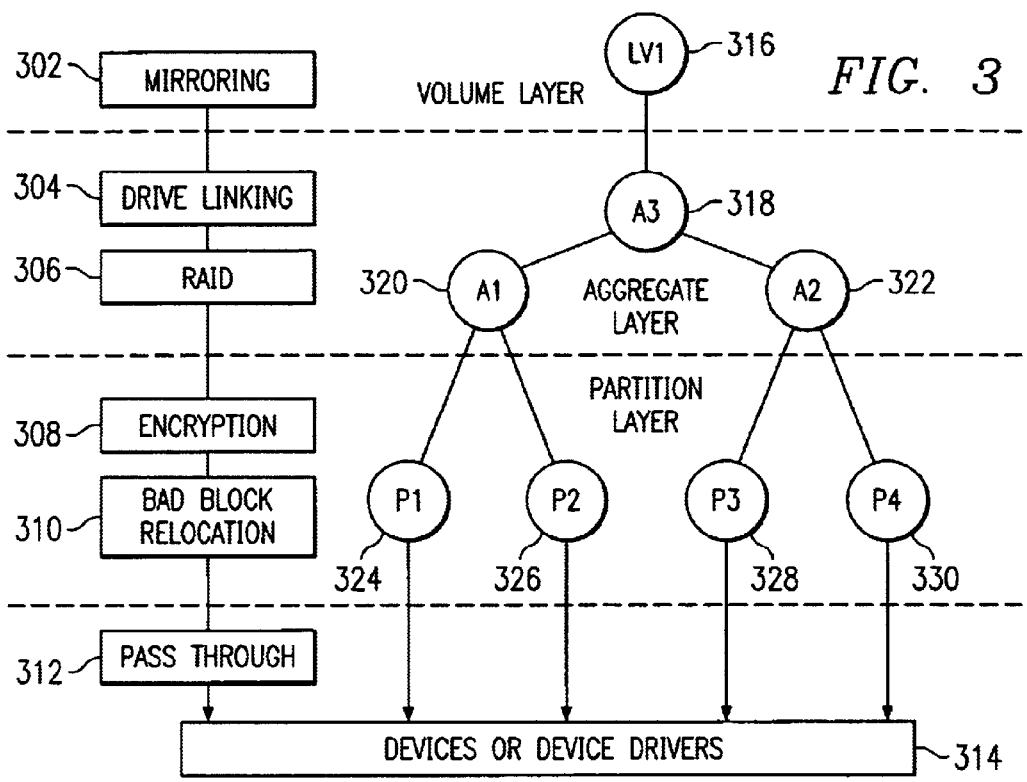

| ATTRIBUTE | DESCRIPTION |
| --- | --- |
| GlobalExclusive | A PLUG-IN WITH THIS ATTRIBUTE CAN NOT WORK WITH ANY OTHER PLUG-IN. IT MUST BE THE ONLY PLUG-IN IN USE ON THE VOLUME. |
| TopExclusive | A PLUG-IN WITH THIS ATTRIBUTE MUST BE THE TOPMOST PLUG-IN IN THE CLASS. |
| BottomExclusive | A PLUG-IN WITH THIS ATTRIBUTE MUST BE THE BOTTOMMOST PLUG-IN IN THE CLASS. |
| ClassExclusive | A PLUG-IN WITH THIS ATTRIBUTE WILL NOT WORK WITH ANY OTHER PLUG-IN IN THIS CLASS. |
| Weight_Factor | A VALUE BETWEEN 1 AND 100 WHERE A VALUE OF 1 INDICATES THAT THE PLUGIN WANTS TO BE AS CLOSE TO THE BOTTOM OF THE PLUG-INS IN THIS CLASS AS POSSIBLE AND A VALUE OF 100 MEANS THAT THIS PLUG-IN WANTS TO AS CLOSE TO THE TOP OF THE PLUG-INS IN THIS CLASS AS POSSIBLE. |
| Feature_Class | EITHER VOLUME CLASS, AGGREGATE CLASS, OR PARTITION CLASS. IDENTIFIES IN WHICH OF THE THREE LAYERS OF THE FEATURE STACK THIS FEATURE MUST APPEAR. |

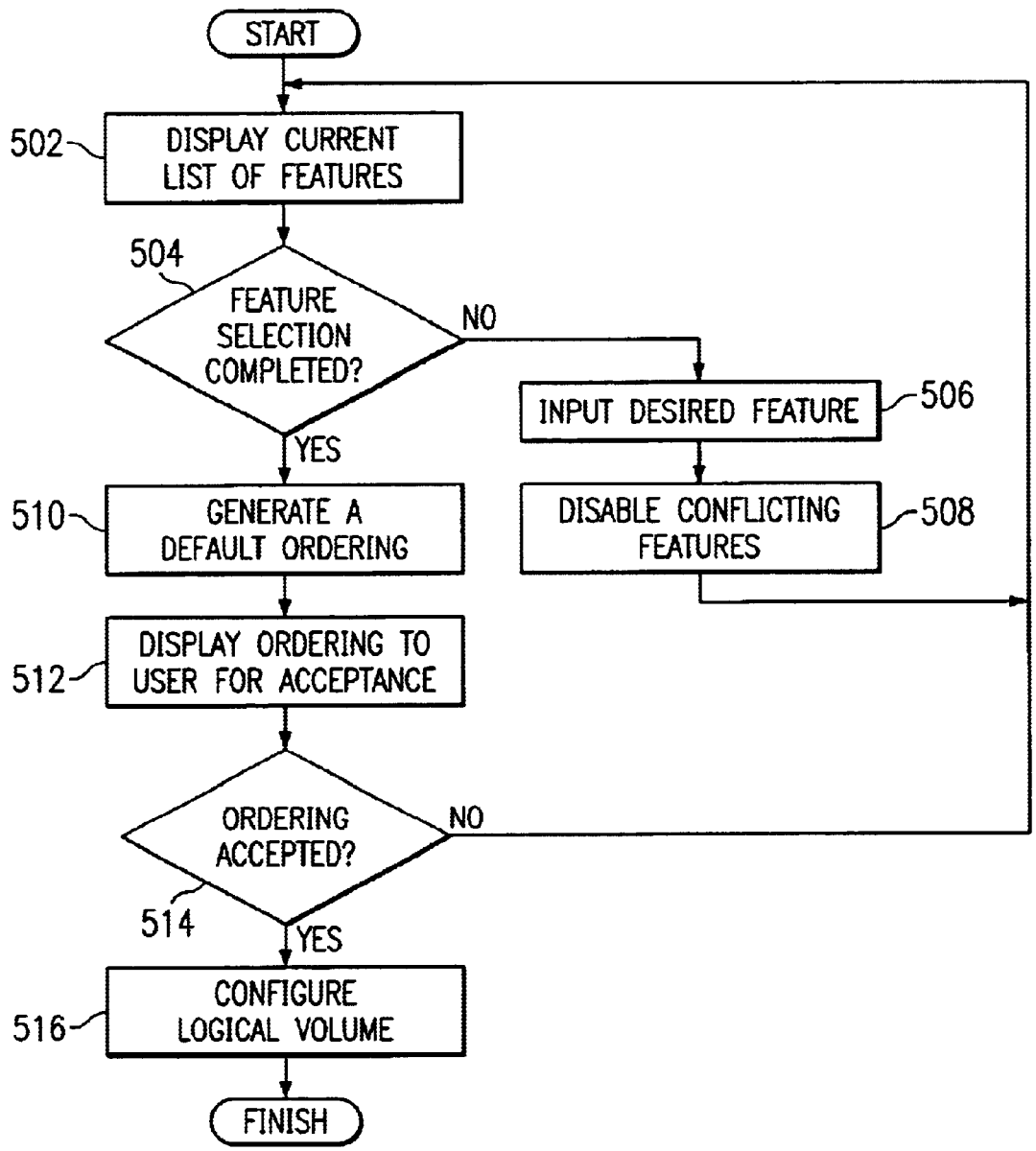

METHOD AND AN APPARATUS TO DYNAMICALLY ORDER FEATURES AND TO RESOLVE CONFLICTS IN A MULTIPLE-LAYER LOGICAL VOLUME MANAGEMENT ENVIRONMENT

RELATED APPLICATIONS

The present application is related to commonly assigned and co-pending U.S. patent application Ser. No. 09/697,579 entitled "METHOD AND AN APPARATUS FOR DYNAMIC COMMAND LINE PARSING IN THE PRESENCE OF MULTIPLE PLUG-IN COMPONENTS" and Ser. No. 09/697,450 entitled "METHOD AND AN APPARATUS FOR VOLUME CREATION IN THE PRESENCE OF MULTIPLE AGGREGATORS", filed on even date herewith, and hereby incorporated by reference.

BACKGROUND OF THE INVENTION

1. Technical Field

The present invention relates generally to an improved method to manage logical volumes and, in particular, to a method and an apparatus for managing a multi-layer logical volume management environment. Still more particularly, the present invention provides a method and an apparatus to order features dynamically and to resolve conflicts in the multi-layer logical volume management environment.

2. Description of the Related Art

The Logical Volume Manager (LVM) is a subsystem for on-line disk storage management that adds an additional layer between the physical devices and the block I/O interface in the kernel of the operating system to allow a logical view on storage. For systems without an LVM, each of the partitions that is usable by the operating system is assigned a drive letter, such as "C:" or "F:", producing a correlating drive letter for each partition on a disk in the computer system. The process which assigns these letters is commonly known.

For systems with an LVM, a drive letter may be mapped instead to a logical volume which may contain one or more partitions. The process by which partitions are combined into a single entity is known generically as "aggregation."

There are various forms of aggregation, such as Drive Linking and software Redundant Array of Independent Disks ("RAID"). Each feature, i.e. a function that may be performed on a partition, aggregate or volume, offered by the LVM for use on a volume is a layer in the LVM. The input to a layer has the same form and structure as the output from a layer. The layers being used on a volume form a stack, and I/O requests are processed from the top most layer down the stack to the bottom most layer. Typically, the bottom most layer is a special layer called the Pass Through layer.

U.S. patent application Ser. No. 09/561,184, abandoned, which is hereby incorporated by reference, discloses a multi-layer logical volume management system for an LVM in the OS/2 operating system. Similar systems can be extended to handle multiple levels of aggregation in other operating systems.

Multiple levels of aggregation allows multiple aggregators, such as Drive Linking and software RAID, to be used together to bypass the limitations inherent in each individual aggregation technology. As an example, many software RAID implementations have a limit on the number of partitions that can be combined into a single entity. However, by using Drive Linking to combine several software RAID entities into a single volume, the volume can have the benefits of software RAID while employing more partitions than software RAID by itself would allow.

A multi-layer logical volume management system introduces complexity and new management issues, such as ordering of features and management of conflicts when two or more features require the same position in a hierarchy. Therefore, it would be advantageous to have a method and an apparatus to manage the various features in a multi-layer logical volume management system.

SUMMARY OF THE INVENTION

The present invention provides a method and apparatus to dynamically order features and resolve conflicts in a logical volume management environment. The method and apparatus classifies features of a logical volume into partition level, aggregate level and volume level classes. Based on these classes and the attributes associated with each feature, ordering of the features in a feature stack is performed and conflicts between features identified for conflict resolution. In addition, the apparatus and method provides a mechanism by which a default ordering of features selected by a user may be generated for a logical volume. The user may accept this default ordering or edit the ordering as long as the user does not generate any conflicts. Any conflicts generated will be reported to the user and the attempted ordering will not be allowed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts the relationship between a feature stack model and a tree model of a multi-layer LVM;

FIG. 4 is a table of attribute values associated with features in accordance with a preferred embodiment of the present invention;

FIG. 5 is a flowchart describing the conflict resolution operation;

DETAILED DESCRIPTION OF THE PREFERRED EMBODIMENT

Figure 1:
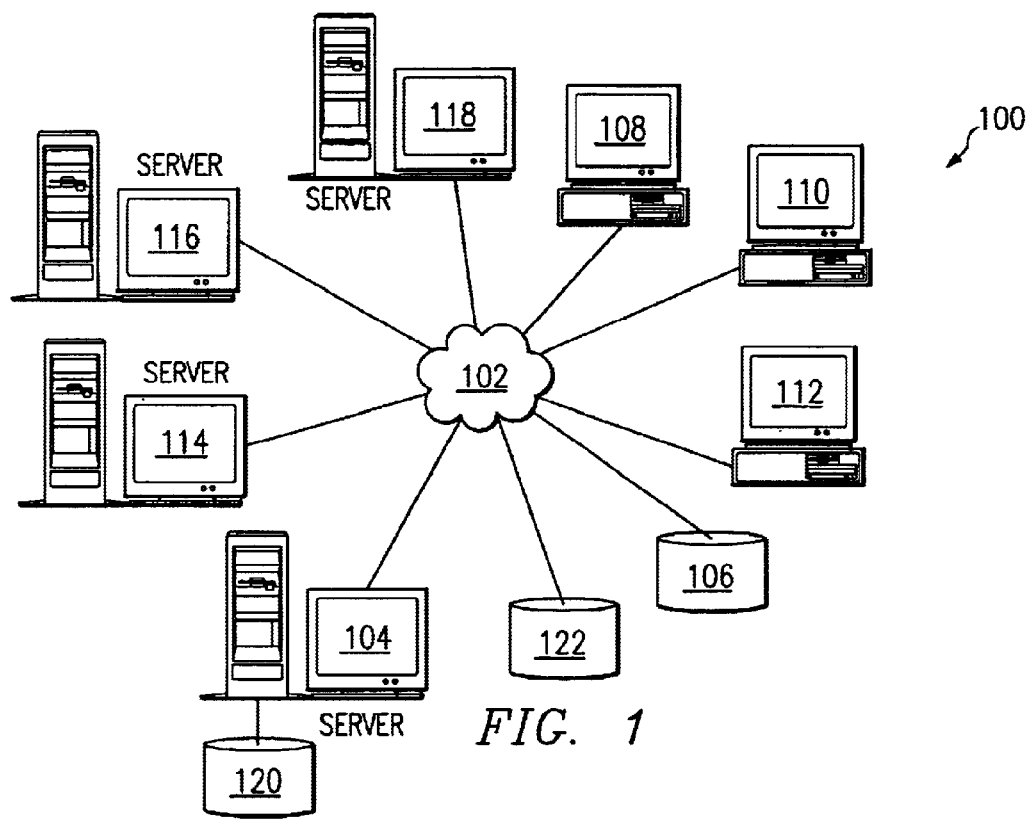
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network. FIG. 1 is intended as an example and not as an architectural limitation for the processes of the present invention.

Figure 2:
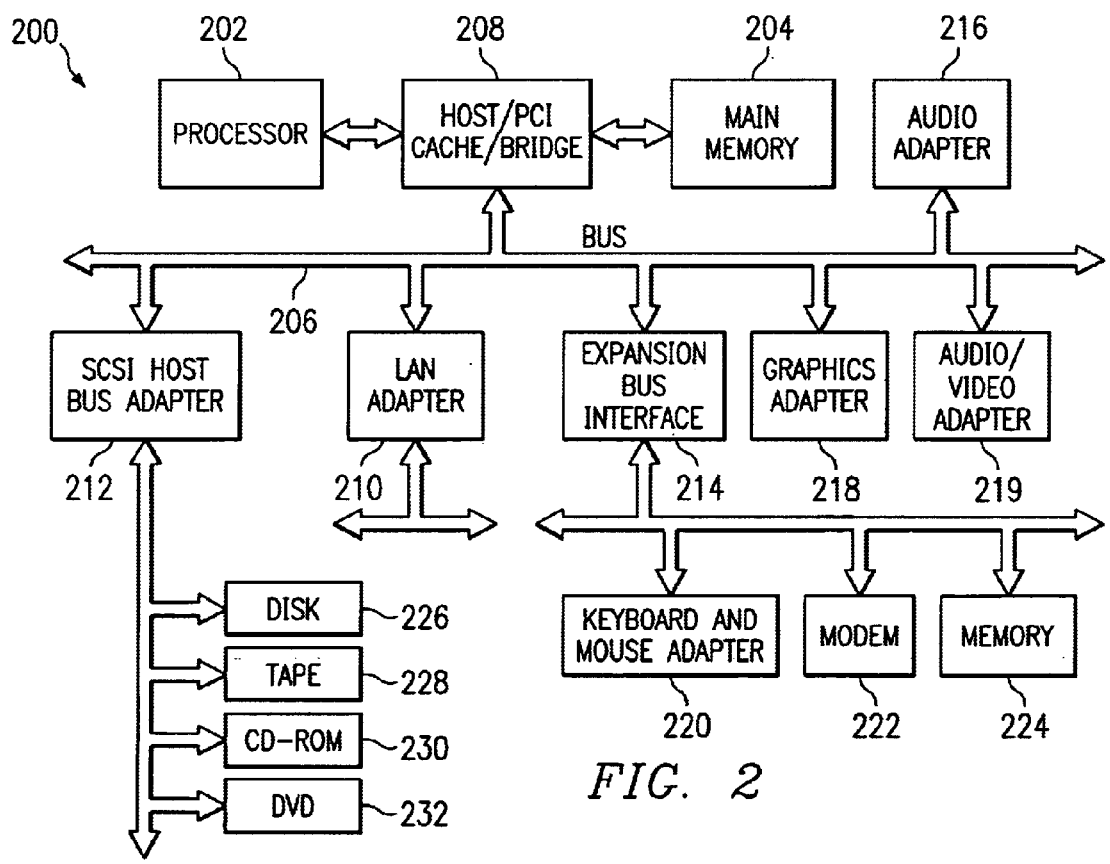
FIG. 2 is a block diagram of a data processing system that may be implemented as a server or a client in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used.

Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

The invention is preferably realized using a well-known computing platform, such as an IBM personal computer, running the IBM OS/2 operating system. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

The present invention provides a mechanism by which features of a logical volume manager (LVM) are dynamically ordered and conflicts between features in a multiple-layer logical volume management environment are resolved. The logical volume manager (LVM) may be implemented in a data processing device, such as data processing device 200 in FIG. 2, or the like. The present invention provides a classification system by which features of the LVM are classified such that conflicts between features may be readily identified. The classification system also allows for a default ordering which may be near optimal.

Features may be provided to the LVM in many different ways. The features may be hard-coded into the LVM, provided as part of software updates, and the like. In a preferred embodiment of the present invention, features are provided as plug-in components of the LVM. A plug-in component is an auxiliary hardware or software component that works with a major software package to enhance its capabilities. The use of plug-in components to modify the features offered by an LVM allows for updating and increasing the capabilities of the LVM.

The classification system of the present invention classifies these plug-in features into one of three different classifications:

1) Partition Level plug-in—A plug-in designed to operate on a partition within a volume;

2) Aggregate Level plug-in—A plug-in that is designed to combine multiple partitions into a single entity called an aggregate or to combine aggregates; and 3) Volume Level plug-in—A plug-in that is designed to operate on an entire volume.

In addition, each plug-in has attributes which may be used along with the above classifications to identify conflicts, resolve conflicts and establish a default ordering of plug-in features.

FIG. 3 shows by way of example the correlation between the "feature stack" model and the "tree" model of a multi-layer logical volume. The feature stack is a hierarchical stack of plug-in features ordered based on their classifications. The lowest level feature is a pass through feature. The next lowest level features are the partition level plug-ins, the middle level features are the aggregate level plug-ins, and the top level features are the volume level features.

On the left of FIG. 3, items 302–312, the "feature stack" is shown. While there is no particular limit on the number of features which may appear in the "feature stack", for simplicity, FIG. 3 employs only six features. In the particular "feature stack" shown in FIG. 3, a "Pass Through" feature 312 is at the bottom which interfaces to the disk devices or device drivers 314. Above the "Pass Through" feature 312 is the Bad Block Relocation ("BBR") feature 310. Above this feature is the Encryption feature 308. Above the Encryption feature is the software RAID 306 and Drive Linking 304 features. At the top of the feature stack is Remote Mirroring 302. From the view of the feature stack model, an I/O request is received at the top of the stack and propagated downwards to the "Pass Through" feature.

The corresponding tree model is shown to the right of the feature stack model. Logical volume LV1 316 is at the root of the tree. The child of LV1 is the aggregate A3 318, which is created by the Drive Linking feature. The Drive Linking feature creates A3 318 from aggregates A2 322 and A1 320, which appear in the tree model as the children of A3 318. Aggregates A1 320 and A2 322 are created by the Software RAID feature, and the partitions from which they are made appear in the tree model as their children. Thus, the software RAID feature creates aggregate A1 320 from partitions P1 324 and P2 326, and creates aggregate A2 322 from partitions P3 328 and P4 330.

An aggregator can group either multiple partitions, as is the case for A1 and A2, or multiple aggregates, as is the case for A3. Allowing multiple features in the feature stack to create aggregates can help overcome some system limitations. For example, many RAID systems limit the number of partitions that may be used in an aggregate. However by allowing disk linking of RAID aggregates, as shown in FIG. 3, this software limitation can effectively be overcome.

It should be noted that only features which act as aggregators in the feature stack model have a direct counterpart in the tree model of the volume. This is because aggregators are actually responsible for creating some of the nodes which appear in the tree model. Other features which appear in the feature stack model do not have corresponding nodes in the tree model, and this is because they affect the processing of an I/O request as it flows from one node in the tree model to another.

Thus, we see that Remote Mirroring 302 affects the processing of an I/O request as the I/O request proceeds from LV1 316 to A3 318 in the tree model of the volume. Similarly, Encryption and BBR affect the processing of I/O requests as they proceed from A1 320 to P1 324 and P2 326, or A2 322 to P3 328 and P4 330. These types of LVM structures, feature stack models, and tree models are well understood in the art, and the models can be equally well applied to logical volume management systems in other operating systems such as Hewlett Packard's HP-UX and IBM's AIX.

The present invention provides a classification system for ordering of items on the feature stack and conflict resolution when two or more items require the same stack position. With the classification system of the present invention, it should be noted that features which act as aggregators are always grouped together on the feature stack. This is because there is little value, if any, to placing non-aggregator features between aggregators.

Since aggregators are always grouped together, they can be used as delimiters to divide a feature stack into three layers or classes of features. Features appearing below the aggregators in the feature stack will be operating on partitions and will thus form the "partition layer". Features found in the "partition layer" are referred to as "partition class" features. The aggregators in the feature stack will form the "aggregate layer", and are referred to as aggregate class features. This leaves the features above the "aggregate layer", which will be operating on what is in essence the volume itself. These features form the "volume layer", and are referred to as volume class features.

Referring to FIG. 3 as an example, Drive Linking 304 and RAID 306 form the aggregation layer. There is a single feature, Remote Mirroring 302, that appears above this level and this is the volume class feature. There are two features, Encryption 308 and Bad Block Relocation 310, that appear below the aggregation layer and these are the partition class features.

In addition to the classes of features, each feature has one or more attributes associated with it. These attributes indicate which layer of the feature stack a feature appears in and they determine an ordering of features within a layer, such as the ordering of Encryption 308 and Bad Block Relocation 310 within the partition layer. Furthermore, these attributes can be used in the conflict resolution process of the present invention when two or more features want to occupy the same position on the feature stack.

FIG. 4 presents a table of attributes according to the present invention. There are two types of attributes, global attributes and those that apply within a layer. The primary example of a global attribute is the specification that a feature must be the only item in the feature stack and cannot work properly if there are any other items in the feature stack. This attribute is called "GlobalExclusive".

The most common use of attributes is to determine ordering within a layer that contains multiple features. For example, consider the aggregate layer in FIG. 3. It is critically important that Drive Linking 304 appears above RAID 306 in the feature stack. This could be guaranteed by specifying that Drive Linking is TopExclusive in the aggregation layer.

The attributes TopExclusive, BottomExclusive, and ClassExclusive in FIG. 4 operate within a class. If two features were BottomExclusive within the same class, there would be a conflict. This ability to detect conflicts can be used to prevent them. For instance, a user interface can use this conflict detection ability to remove choices from menus that would create conflicts based upon choices the user has already made. This would effectively prevent conflicts from occurring by never permitting the user to make a choice that would result in a conflict.

The Weight_Factor attribute indicates a relative positioning of features. A value between 1 and 100 is used to guide the LVM interface when attempting to establish a default ordering for features within a class. A value of 1 indicates that this feature wants to be as close to the bottom of the features in this class as possible. A value of 100 means that this feature wants to be as close to being the topmost feature in this class as possible. This value is only used to order those features within a class which do not have any of the "exclusive" flags set.

Thus, if there are four features in a class, one with the TopExclusive flag set, one with the BottomExclusive flag set, one with a Weight_Factor of 1, and one with a Weight_Factor of 100, the top most position on the feature stack for any feature in this class would go to the feature with the TopExclusive flag set. The feature immediately below it on the feature stack would be the feature with the Weight_Factor of 100. The feature below that would be the feature with the Weight_Factor of 1. The bottom most position on the feature stack for a feature of this class would be occupied by the feature with the BottomExclusive flag set.

While the description of the exemplary embodiments of the present invention assumes that a plug-in feature may only belong to one feature class, the invention is not limited to such embodiments. A plug-in may belong to more than one feature class in which case it will have a set of attributes for each feature class to which it belongs. The Feature_Class attribute is used to associate a set of attributes for a plug-in module with a particular feature class and, thus, how the LVM should treat that plug-in module when it is being used as a member of that particular feature layer in the feature stack.

With the present invention, a user may be provided with a listing of features available for use with a logical volume.

The user may then select those features that he/she is interested in applying to the logical volume. Each time the user selects a feature, the system can determine which of the remaining unselected features conflicts with the features that have already been selected. These can be removed from the list of features that the user has to choose from, thereby preventing conflicts.

Once feature selection has been completed, the present invention generates a default feature stack based on the classes of the selected features and their attributes. For non-interactive interfaces, any conflicts that are detected will be reported. For interactive interfaces not employing the previously described method for preventing conflicts, any conflicts between selected features will be detected and reported to the user so that the user can select a different set of features, or otherwise resolve the conflict.

Once the default ordering is generated, the user is provided with a listing of the feature stack ordering. At this time, the user may be provided with the option of accepting the default ordering or editing the order. The user may then reorder the features in any way he/she sees fit so long as the user does not generate any conflicts, as determined by the classification and attributes of the features. Any conflicts generated by the user will not be allowed and an indication of the conflict may be provided to the user.

Once an ordering is accepted by the user, this feature stack ordering will be applied to the logical volume such that any input/output operations on the logical volume will be processed in accordance with the accepted feature stack ordering.

FIG. 5 is a flowchart describing an interactive conflict resolution process. This process is used by the LVM whenever a user is creating a volume. A user is shown a display of available features (step 502). Initially all listed features may be available, but as the operation continues some may be marked as selected and others may be disabled as choices due to potential conflicts. If the process of selecting features has not been completed (step 504: No), then the user selects the next desired feature (step 506). Selection of a particular feature may or may not disable other features (step 508). The current list is then redisplayed (step 502) and the operation continues.

The user will eventually indicate that feature selection is completed (step 504: yes). A default ordering of features is generated (step 510) based upon the attributes of the selected features, and then displayed to the user for acceptance (step 512). If the user does not accept the ordering (step 514: no), the user may be allowed to reorder the features as long as the new order does not cause any conflicts. If the user generates a conflict, the user may be notified of the conflict and the attempted ordering will not be allowed.

Alternatively, the user may be allowed to discard their list of selected features and return to the selection mode (step 502) to begin the feature selection process anew. If the user accepts the final ordering (step 514: yes), then the logical volume is configured based on the selected features and the final ordering of those features as determined by their attributes (step 516).

Thus, the present invention provides a mechanism by which features of a logical volume may be classified into partition level, aggregate level and volume level classes. Based on these classes and attributes of the features, ordering of the features in a feature stack may be performed and conflicts between features identified for conflict resolution. In addition, the present invention provides a mechanism by which a default ordering of features selected by a user may be generated for a logical volume. The user may accept this default ordering or edit the ordering as long as the user does not generate any conflicts. Any conflicts generated will be reported to the user and the attempted ordering will not be allowed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. An apparatus for resolving conflicts between features of a logical volume, comprising:

means for classifying the features into classes;

means for identifying attributes of the features; and means for resolving conflicts between the features based on the classes and attributes of the features, wherein the means for resolving conflicts between features includes means for determining a default ordering of the features within a class based on the attributes of the features and means for determining a default ordering of the features within the volume based on the classes of the features.

2. The apparatus of claim 1, further comprising:

means for receiving an instruction to change the default ordering of the features within the volume to a user defined ordering;

means for determining if the user defined ordering generates any conflicts between features; and means for notifying the user of any conflicts and not allowing the user defined ordering if the user defined ordering does generate any conflicts between features.

3. A method of resolving conflicts between features of multi-layer logical volume, comprising:

classifying the features into classes;

identifying attributes of the features; and resolving conflicts between the features of the multi-layer logical volume based on the classes and attributes of the features, wherein the attributes include at least one of global exclusive, top exclusive, bottom exclusive, class exclusive, and a weight factor, and wherein a feature having a global exclusive attribute cannot work with any other feature on the logical volume.

4. A method of resolving conflicts between features of a multi-layer logical volume, comprising:

classifying the features into classes;

identifying attributes of the features; and resolving conflicts between the features of the multi-layer logical volume based on the classes and attributes of the features, wherein the attributes include at least one of global exclusive top exclusive, bottom exclusive, class exclusive, and a weight factor, and wherein a feature having a top exclusive attribute must be a highest priority feature in a class in which the feature is classified.

5. A method of resolving conflicts between features of a multi-layer logical volume, comprising:

classifying the features into classes;

identifying attributes of the features; and resolving conflicts between the features of the multi-layer logical volume based on the classes and attributes of the features, wherein the attributes include at least one of global exclusive, top exclusive, bottom exclusive, class exclusive, and a weight factor, and wherein a feature having a bottom exclusive attribute must be a lowest priority feature in a class in which the feature is classified.

6. A method of resolving conflicts between features of a multi-layer logical volume, comprising:

classifying the features into classes; identifying attributes of the features; and resolving conflicts between the features of the multi-layer logical volume based on the classes and attributes of the features, wherein the attributes include at least one of global exclusive, top exclusive, bottom exclusive, class exclusive, and a weight factor, and wherein a feature having a class exclusive attribute cannot work with any other feature in a same class as the feature.

7. A method of resolving conflicts between features of a multi-layer logical volume, comprising:

classifying the features into classes;

identifying attributes of the features; and resolving conflicts between the features of the multi-layer logical volume based on the classes and attributes of the features, wherein the attributes include at least one of global exclusive, top exclusive, bottom exclusive, class exclusive, and a weight factor, and wherein the weight factor attribute provides a measure of a relative priority of the features of the logical volume.

8. A method of resolving conflicts between features of a logical volume, comprising:

classifying the features into classes;

identifying attributes of the features; and resolving conflicts between the features based on the classes and attributes of the features, wherein resolving conflicts between features includes determining a default ordering of the features within a class based on the attributes of the features and determining a default ordering of the features within the volume based on the classes of the features.

9. The method of claim 8, further comprising:

receiving an instruction to change the default ordering of the features within the volume to a user defined ordering;

determining if the user defined ordering generates any conflicts between features; and notifying the user of any conflicts and not allowing the user defined ordering if the user defined ordering does generate any conflicts between features.

10. A computer program product in a computer readable medium for resolving conflicts between features of a multi-layer logical volume, comprising:

first instructions for classifying the features into classes;

second instructions for identifying attributes of the features;

third instructions for resolving conflicts between the features of the multi-layer logical volume based on the classes and attributes of the features, wherein the attributes include at least one of global exclusive, top exclusive, bottom exclusive, class exclusive, and a weight factor, and wherein a feature having a global exclusive attribute cannot work with any other feature on the logical volume.

11. A computer program product in a computer readable medium for resolving conflicts between features of a multi-layer logical volume comprising:

first instructions for classifying the features into classes;

second instructions for identifying attributes of the features;

third instructions for resolving conflicts between the features of the multi-layer logical volume based on the classes and attributes of the features, wherein the attributes include at least one of global exclusive, top exclusive, bottom exclusive, class exclusive, and a weight factor, and wherein a feature having a top exclusive attribute must be a highest priority feature in a class in which the feature is classified.

12. A computer program product in a computer readable medium for resolving conflicts between features of a multi-layer logical volume, comprising:

first instructions for classifying the features into classes;

second instructions for identifying attributes of the features;

third instructions for resolving conflicts between the features of the multi-layer logical volume based on the classes and attributes of the features, wherein the attributes include at least one of global exclusive, top exclusive, bottom exclusive, class exclusive, and a weight factor, and wherein a feature having a bottom exclusive attribute must be a lowest priority feature in a class in which the feature is classified.

13. A computer program product in a computer readable medium for resolving conflicts between features of a multi-layer logical volume, comprising:

first instructions for classifying the features into classes;

second instructions for identifying attributes of the features;

third instructions for resolving conflicts between the features of the multi-layer logical volume based on the classes and attributes of the features, wherein the attributes include at least one of global exclusive, top exclusive, bottom exclusive, class exclusive, and a weight factor, and wherein a feature having a class exclusive attribute cannot work with any other feature in a same class as the feature.

14. A computer program product in a computer readable medium for resolving conflicts between features of a multi-layer logical volume, comprising:

first instructions for classifying the features into classes;

second instructions for identifying attributes of the features;

third instructions for resolving conflicts between the features of the multi-layer logical volume based on the classes and attributes of the features, wherein the attributes include at least one of global exclusive, top exclusive, bottom exclusive, class exclusive, and a weight factor, and wherein the weight factor attribute provides a measure of a relative priority of the features of the logical volume.

15. A computer program product in a computer readable medium for resolving conflicts between features of a logical volume, comprising:

first instructions for classifying the features into classes;

second instructions for identifying attributes of the features; and third instructions for resolving conflicts between the features based on the classes and attributes of the features, wherein the third instructions for resolving conflicts between features includes instructions for determining a default ordering of the features within a class based on the attributes of the features and instructions for determining a default ordering of the features within the volume based on the classes of the features.

16. The computer program product of claim 15, further comprising:

fourth instructions for receiving an instruction to change the default ordering of the features within the volume to a user defined ordering;

fifth instructions for determining if the user defined ordering generates any conflicts between features; and sixth instructions for notifying the user of any conflicts and not allowing the user defined ordering if the user defined ordering does generate any conflicts between features.

\* \* \* \* \*

UNITED STATES PATENT AND TRADEMARK OFFICE
CERTIFICATE OF CORRECTION

PATENT NO. : 6,751,719 B1 Page 1 of 1
APPLICATION NO. : 09/697449
DATED : June 15, 2004
INVENTOR(S) : Peloquin et al.

It is certified that error appears in the above-identified patent and that said Letters Patent is hereby corrected as shown below:

Col. 9, line 1: after "global exclusive" insert --,--.

Col. 9, line 20: after "into classes;" insert a return.

Signed and Sealed this

Fifteenth Day of January, 2008

JON W. DUDAS
*Director of the United States Patent and Trademark Office*